United States Patent Office 2,875,212
Patented Feb. 24, 1959

2,875,212

PROCESS OF PREPARING CERTAIN 2-AMINO INDOLES

Karl Hoffmann, Binningen, and Jindrich Kebrle, Basel, Switzerland, assignors to Ciba Pharmaceutical Products Inc., Summit, N. J.

No Drawing. Application July 10, 1956
Serial No. 597,047

Claims priority, application Switzerland July 18, 1955

6 Claims. (Cl. 260—319)

This invention provides 1-R-2-amino-indoles, in which R represents the organic residue of an alcohol, and especially salts of these compounds. The indole nucleus may contain further substituents in the benzene nucleus, especially in the 5-position free or substituted hydroxyl or amino groups, halogen atoms or alkyl residues.

The invention also provides a novel process for the manufacture of the above 1-R-2-amino-indoles, wherein a benzyl cyanide, which contains a free amino group in the ortho-position, is reacted with a reactive ester of an alcohol, especially an aliphatic alcohol. Reactive esters of such alcohols are esters of strong acids, such as hydrohalic acids or organic or inorganic sulphonic acids, such as benzene sulphonic acid, or para-toluene sulphonic acid. The reaction may be carried out in the absence or presence of a solvent, and it generally takes place in the cold almost quantitatively.

By the above process the new indoles are obtained in the form of their salts and in a state of high purity, which is an advantage in as much as the free bases are very unstable and difficult to handle. However, the salts can be recrystallized and are of unlimited stability.

The new indoles have an antibacterial action, especially against gram-positive bacteria, as for example, *Staphylococcus aureus*.

It is very surprising that the process of this invention should take place in the manner indicated above, because from prior knowledge it would have been expected that the treatment of the benzyl cyanide containing a free amino group with a reactive ester of an alcohol would have led simply to substitution of the amino group. It could not be expected that the indole system would be formed by ring closure, because it is known that ortho-amino-benzyl cyanide requires boiling with alkali in order to be transformed into 2-amino-indole unsubstituted in 1-position. (R. Pschorr and G. Hoppe: "Berichte der deutschen chemischen Gesellschaft," volume 43, page 2543 (1910).)

The aforesaid ortho-amino benzyl cyanides used as starting materials are known or can easily be made by reducing the corresponding ortho-nitro-compounds.

From the salts obtained by the present process the 1-R-2-amino-indoles can be obtained in the form of their free bases by reaction with alkalies, the bases being extremely sensitive to oxidising agents from the free bases the acid addition salts can be obtained by reaction with acids.

The following examples illustrate the invention:

Example 1

1.5 grams of ortho-amino-benzyl cyanide are dissolved in 2 cc. of alcohol and the solution is mixed with 2 cc. of methyl iodide. After 2–3 days the 1-methyl-2-amino-indole hydriodide which is crystallized out is filtered off with suction and washed with a small amount of alcohol. The yield is 95% of the theoretical yield. The product decomposes above 260° C.

The free base distills at 100–110° C. under a pressure of 0.05 mm. of mercury, and when sealed in an evacuated tube it melts at 57° C.

Example 2

1 gram of ortho-amino-benzyl cyanide is dissolved in 3 cc. of alcohol. .2 cc. of benzyl chloride are added to the warm solution. After 3 days the reaction mixture is freed in vacuo from the excess of alcohol and benzyl chloride, and the residue is re-crystallized several times from a mixture of alcohol and ether. The 1-benzyl-2-amino-indole hydrochloride so obtained decomposes above 260° C. The yield is 67% of the theoretical yield.

Example 3

3 grams of ortho-amino-enzyl cyanide are dissolved in 5 cc. of alcohol and mixed with 3 cc. of ethyl bromacetate. After 4 days the crystalline 1-carbethoxymethyl-2-amino-indole hydrobromide is filtered off. The yield is 83%. The product decomposes above 260° C.

Example 4

10 grams of ortho-amino-benzyl cyanide are covered with 20 cc. of ethyl iodide. After 20 days the 1-ethyl-2-amino-indole hydriodide crystallizes out in dense prisms and is filtered off and washed with a small amount of alcohol. The yield is 87% of the theoretical yield. The product decomposes above 260° C.

Example 5

1 gram of 2-amino-5-methoxy-benzyl cyanide is dissolved in 2 cc. of alcohol and the solution is mixed with 2 cc. of methyl iodide. After 2 days the alcohol and the excess of methyl iodide are removed in vacuo and the resulting 1-methyl-2-amino-5-methoxy-indole hydriodide is recrystallized from alcohol. The yield is 77% of the theoretical yield. The product decomposes above 260° C.

The 2-amino-5-methoxy-benzyl cyanide used as starting material can be obtained by reduction of the corresponding nitro compound with nickel and hydrogen in ethyl acetate. It melts at 88° C.

Example 6

400 mg. of 2-amino-5-benzyloxy-acetonitrile are dissolved in 2 cc. of absolute alcohol and then mixed with 2 cc. of methyl iodide. The mixture is allowed to stand in the dark for 2 days at room temperature, after which the crystallized material is filtered off. The mother liquor is evaporated to dryness in vacuo and the residue recrystallized from water. The two crystal fractions are jointly recrystallized, and colorless needles obtained in a yield of 77 percent of the theoretical yield. The 1-methyl-2-amino-5-benzyloxy-indole-hydroiodide thus obtained melts above 200° C., charring gradually. By shaking with AgCl in aqueous solution the hydrochloride is obtained which dissolves much more readily in water and melts at 235° C. with decomposition. By hydrogenolyses there is obtained the corresponding product with a free hydroxyl group in 5-position. The 5-benzyloxy-2-amino-acetonitrile used as starting material is obtained, in analogy to the 2-amino-5-methoxy-benzylcyanide, by catalytic reduction of the corresponding nitro compound.

What is claimed is:

1. Process for the preparation of an acid addition salt of a 1-substituted 2-amino-indole, which comprises reacting a benzyl cyanide having in ortho-position a free amino group with a member selected from the group consisting of an alkyl halide and a mononuclear aralkyl halide.

2. Process for the preparation of an acid addition salt of a 1-substituted 2-amino-indole, which comprises reacting a benzyl cyanide having in ortho-position a free amino group with a methyl halide wherein the halogen atom has an atomic weight greater than 19.

3. Process for the preparation of an acid addition salt of a 1-substituted 2-amino-indole, which comprises reacting a benzyl cyanide having in ortho-position a free amino group with an ethyl halide wherein the halogen atom has an atomic weight greater than 19.

4. Process for the preparation of an acid addition salt of a 1-substituted 2-amino-indole, which comprises reacting a benzyl cyanide having in ortho-position a free amino group with a benzyl halide wherein the halogen atom has an atomic weight greater than 19.

5. Process for the preparation of an acid addition salt of a 1-substituted 2-amino-indole, which comprises reacting a benzyl cyanide having in ortho-position a free amino group with a lower alkyl halo acetate.

6. Process for the preparation of an acid addition salt of a 1-substituted 2-amino-indole, which comprises reacting a benzyl cyanide having in ortho-position a free amino group with a bromacetic acid ethyl ester.

References Cited in the file of this patent

Pschorr et al.: Ber. Deut. Chem., vol. 43, pp. 2543–52 (1910).